June 1, 1954 K. F. FINN Re. 23,832

ADJUSTING AND LATCH MEANS FOR SLIDABLE SIDE JAW WRENCHS

Original Filed Jan. 17, 1952

INVENTOR.

BY Kenneth F. Finn
A. Hiram Sturges
Attorney

Reissued June 1, 1954 Re. 23,832

UNITED STATES PATENT OFFICE 23,832

ADJUSTING AND LATCH MEANS FOR SLIDABLE SIDE JAW WRENCHES

Kenneth F. Finn, Omaha, Nebr., assignor, by direct and mesne assignments, of forty-seven per cent to Donald J. Finn and six per cent to A. Hiram Sturges, both of Omaha, Nebr.

Original No. 2,657,606, dated November 3, 1953, Serial No. 266,983, January 17, 1952. Application for reissue January 4, 1954, Serial No. 402,196

5 Claims. (Cl. 81—165)

Matter enclosed in heavy brackets [ ] appears in the original patent but forms no part of this reissue specification; matter printed in italics indicates the additions made by reissue.

This invention relates to adjustable wrenches and more particularly it is an object of the invention to provide a more tightly gripping wrench.

A particular object is to provide a wrench having means for fast adjustment for use in sequence.

Another object is to provide such a wrench which has work engaging surfaces which move toward each other linearly during each adjustment so as to avoid the disadvantages of wrenches of the prior art, the work surfaces of which do not move linearly.

Yet another object is to provide a wrench, the tight adjustment of which is made by a lever for good clamping action.

A further object is to provide a wrench which is usable on pipe and round surfaces as well as on nuts and bolts.

Still a further object is to provide a wrench which can be economically manufactured by making use of presently mass-produced parts.

Another object is to provide a wrench, the parts of which can be readily disassembled for cleaning.

A further object is to provide compactness in the wrench for ease of storage and marketable appearance.

Yet another object of the invention is to provide a device for the purpose described which is sturdy and durable in construction, reliable and efficient in operation, and relatively simple and inexpensive to manufacture, assemble and utilize.

Other and further objects and advantages of the present invention will be apparent from the following detailed description, drawings and claims, the scope of the invention not being limited to the drawings themselves as the drawings are only for the purpose of illustrating a way in which the principles of this invention can be applied.

Other embodiments of the invention utilizing the same or equivalent principles may be used and structural changes may be made as desired by those skilled in the art without departing from the present invention and the purview of the appended claims.

Figure 3:
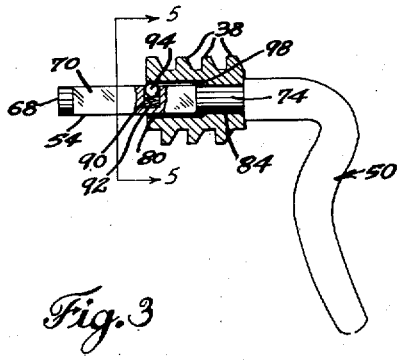

Figure 3 is a view of the worm and lever with the handle portion of the lever turned at an angle of approximately twenty-five degrees. The lever and worm in Figure 3 are drawn on a larger scale and differently proportioned than in Figure 1 and the worm is shown in cross section. A portion of the rectangular cross sectioned inner end of the lever is broken away to show a ball and spring assembly.

Figure 1:
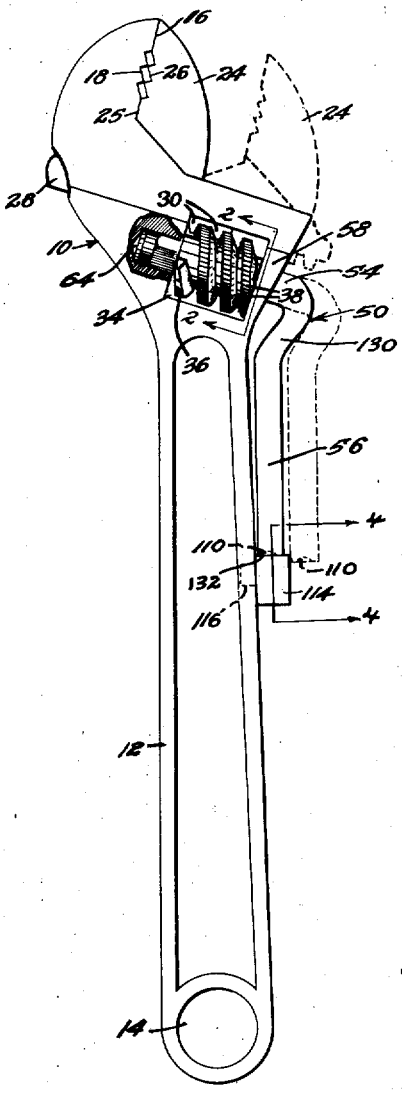
Figure 1 is a side elevation of the wrench. Optional positions of the movable jaw and the operating position of the lever are shown in dotted lines.
Figure 4:
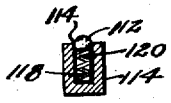

Figure 4 is a view-in-section taken through a lever holding lock along the line 4—4 of Figure 1.

Figure 5:
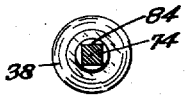

Figure 5 is a view-in-section taken along the line 5—5 of Figure 3.

The wrench of this invention is provided with a stationary jaw member generally indicated at 10 and having an elongated handle portion 12 at one end provided with an aperture 14 as is conventional.

The stationary jaw member 10 is provided with a work engaging surface 16 which is inclinedly disposed with respect to being generally aligned with the handle 12. The surface 16 is provided with a series of transverse notches 18 for gripping pipes and other rounded objects. The notches 18 are centrally disposed and on either side thereof are flat surfaces for engaging the flat surfaces of bolts, nuts and the like.

The wrench is further provided with a movable jaw or side jaw member 24 slidably mounted on the stationary jaw member 10 for linear movement thereon. The member 24 has a work engaging surface 25 having centrally disposed transverse notches 26 for gripping rounded surfaces and flat surfaces on either side disposed opposite the work engaging surface 16 of the stationary jaw member 10.

The movable jaw member 24 has an elongated transverse lower portion 28 provided with a linear row of rack teeth 30 thereon, the portion 28 being received in a suitable slot in the jaw member 10 as is old in the art.

The stationary jaw member 10 is further provided with a preferably rectangular worm opening 34 extending therethrough for receiving a knurl or worm 36 provided with external spiral screw threads 38. The threads 38 are operably received in the teeth 30 of the movable jaw member 24. All of the foregoing is old and conventional in the art and the new features of this invention will now be described.

In accordance with this invention an elongated torque-applying means as for example the lever generally indicated at 50 is provided, the lever having a straight axle portion 54 at one end and having a handle portion 56 at its other end.

The axle portion 54 is rotatably received in an axial opening through that portion 58 of the stationary jaw member 10 which is between the rectangular opening 34 and the exterior of the stationary jaw member 10. The innermost end of the axle member 54 is rotatably received in a recess 64 having cylindrical axle walls, the recess 64 extending into the stationary jaw member 10 from a surface of the opening 34, as best seen in Figure 1.

The axle portion 54 of the axle 50 has a cylindrical end section 68 for reception in the recess 64 and has a section 70 rectangular in cross section extending from a portion 68 to another cylindrical section 74 of the axle portion 54, as best seen in Figure 3.

The cylindrical sections 68 and 74 are of a diameter equal to the thickness from flat side surface to opposite flat side surface of the polygonal cross section 70, here being shown for example as rectangular.

As thus described it will be understood that the axle portion 54 is slidably longitudinal of the worm 38, the worm 38 having a hollow interior opening at each end, the hollow interior having a cylindrical shaped left hand inner portion 80 of a diameter larger than the corner to corner thickness of the section 70, as best seen in Figure 3.

Figure 2:
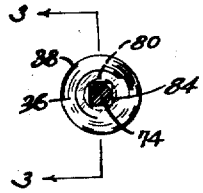
Figure 2 is a view of the worm as seen along the line 2—2 of Figure 1, a round section of the axle portion of the lever being shown in cross section disposed in a rectangular cross sectioned outer end of the worm. A circular cross sectioned inner surface of the worm being shown in dotted lines.

The hollow interior of the knurl 38 further has an outer or right hand portion of a rectangular cross section 84 as seen in Figures 2 and 3. The thickness of the section 84 from flat surface to opposite flat surface is the same as the diameter of the portion 74 of the axle portion 54 of the lever 50 whereby the portion 74 is snugly but slidably received in the portion 84. The portion 70 has a small recess 90 extending inwardly for receiving a spring 92 beneath a ball 94. The ball 94 is adapted to be disposed with its major portion inside the recess 92 and a portion extending outwardly of the recess 92 to bear against the inner surface of the hollow portion 80 of the worm 38. The outer edge of the walled recess 90 is peened inwardly to prevent the ball 94 from escaping from the recess 90.

The proportions of the axle portion should be such that when the lever 50 is pulled out into the dotted line position, Figure 1, that the ball 94 is disposed in the right end of the portion 80 against one of the four shoulders 98 disposed at the junction of the walls of the portions 80 and 84.

The length of the axle portion 54 must be such that the inner end thereof does not come out of the recess 64 when the lever 50 is in the dotted line position.

It will be seen that the lever 50 can be removed from the knurl and stationary portion 10 for replacement or cleaning.

The axle portion 54 of the lever 50 is connected to the straight handle portion 56 of the lever by a reverse curved portion 130 which curves sharply inwardly toward the handle 12 of the wrench adjacent the outer end of the axle portion 54 and then bends downwardly to connect to the handle portion 56 which latter is disposed in approximate parallelism to the handle 12 of the wrench.

The lower end of the handle portion 56 of the lever 50 has a recess 110 shown in dotted lines in Figure 1 for receiving a ball 112 mounted in a protrusion 114 attached to and extending transversely outwardly therefrom the handle 12 by a nib shown in dotted lines at 116 in Figure 1.

The ball 112 is urged outwardly of a recess 118 in the protrusion 114 by a spring 120. The edges of the recess 118 are peened inwardly at 124 to hold the ball.

It will be seen that the ball 112, spring 20 and protrusion 114 form a clasp for holding the lower end of the lever 50 in place when it is not being used. The lever 50 can be pushed off of the ball 112 and then pulled into the outer dotted line position. It is preferable that the inner corner of the lowermost end of the lever handle 56 be slanted as best seen at 132 so as to more easily clear the protrusion 114 in use.

As thus described, it will be seen that the worm 36 is a conventional manual device for adjusting the slideable jaw 24, and that the lever forms a mechanical means operatively associated with the manual worm device and movable relatively to the worm device into clutching and declutching relationship therewith for selectively operating the worm 36 with mechanical advantage superior to manual force.

The specific clutching and declutching means shown is but one example of complementary clutching and declutching formations.

It will be seen that this invention has provided an adjustable worm-type wrench improvement making possible the tight gripping of a nut or a rounded surface without impairing the fast worm adjustment.

From the foregoing description, it is thought to be obvious that an adjustable wrench constructed in accordance with my invention is particularly well adapted for use, by reason of the convenience and facility with which it may be assembled and operated, and it will also be obvious that my invention is susceptible of some change and modification without departing from the principles and spirit thereof, and for this reason I do not wish to be understood as limiting myself to the precise arrangement and formation of the several parts herein shown in carrying out my invention in practice, except as claimed.

I claim:

1. In a slidable side jaw wrench provided with an elongated handle, a head portion attached to said handle at one end thereof, a fixed jaw protruding outwardly from said head portion, said fixed jaw having a work engaging surface, said head portion having a worm opening therethrough extending generally transversely to said work engaging surface; a slidable jaw cooperating with the stationary jaw in gripping an object, teeth on the slidable jaw extending into said worm opening; an adjusting worm disposed in said opening and cooperating with the slidable jaw teeth in moving the slidable jaw with respect to the stationary jaw, the axis of said worm being in parallelism with the sliding motion of said jaw, said worm having an axial opening therethrough, the improvement which consists of: an axle rotatably mounted in said head and extending from said worm opening through one side of said head, said axle being slidable endwise with respect to said head, said axle and the walls of said axial worm opening having complementary clutching and declutching portions whereby when said axle is in an outer position said clutching portions are in engagement and when said axle is in an inner position said clutching portions are disengaged; a lever permanently attached to the outer end of said axle and extending transversely to said axle; means for preventing said axle from coming entirely out of said worm in normal use, said handle having a protrusion projecting transversely outwardly therefrom at the outer end of said lever; and means removably holding said outer end of said lever in a fixed position with respect to said handle protrusion.

2. In a slidable side jaw wrench provided with a handle, a head portion attached to said handle, said head portion having a fixed jaw protruding outwardly therefrom, said fixed jaw having a work engaging surface, said head portion having a worm opening therethrough extending generally transversely to said work engaging surface; a slidable jaw cooperating with the stationary jaw in gripping an object, teeth on the slidable jaw extending into said worm opening; an adjusting worm disposed in said opening and cooperating with the slidable jaw teeth in moving the slidable jaw with respect to the stationary jaw, the axis of said worm being in parallelism with the sliding motion of said jaw, said worm having an axial opening therethrough, the improvement which consists of: an axle rotatably mounted in said head and extending from said worm opening through one side of said head, said axle being slidable endwise with respect to said head, said axle and the walls of said axial worm opening having complementary clutching and declutching portions whereby when said axle is in an outer position said clutching portions are in engagement and when said axle is in an inner position said clutching portions are disengaged; means for manually rotating said axle; and means for preventing said axle from coming entirely out of said worm in normal use.

3. In a conventional slidable side jaw wrench provided with a worm and rack form of adjusting means for the slidable jaw, the improvement which includes complementary polygonal formations provided on and extending axially within the worm and on an exterior cooperating surface of a worm-adjusting means, respectively; said worm adjusting means being axially movable from a position in which the polygonal formations are disengaged to a position in which they are engaged; said worm adjusting means including a torque-applying means for rotating said worm, when the polygonal formations are engaged, and for locking the worm and slidable jaw in work-clamping positions; said worm-adjusting means, when the polygonal formations are in disengaged position, being freely rotatable with respect to the worm, so that the worm then may be manually adjusted in the ordinary manner.

4. In a conventional slidable side jaw wrench provided with a worm and rack form of adjusting means for the slidable jaw, the improvement which includes complementary clutching and declutching formations provided on and extending within the worm and on an exterior cooperating surface of a worm-adjusting means, respectively; said worm-adjusting means being axially movable from a position in which the clutching and declutching formations are disengaged to a position in which they are engaged; said worm-adjusting means including a torque-applying means for rotating said worm, when the clutching and declutching formations are engaged, and for locking the worm and slidable jaw in work-clamping positions; said worm-adjusting means, when the clutching and declutching formations are in disengaged position, being freely rotatable with respect to the worm, so that the worm then may be manually adjusted in the ordinary manner.

*5. In a conventional slidable side jaw wrench provided with a worm and rack form of adjusting means for the slidable jaw, and an elongated handle normal to the worm axis, the improvement which comprises a lever for applying torque to said worm, said lever having one end concentric with the axis of said worm and its other end or handle end extending in a direction generally parallel to and to one side of the wrench handle, said handle end of the lever being substantially spaced from the adjacent end of said worm, said handle end of the lever being of appreciably greater length than the outer diameter of said worm for applying a greater than manual torque to said worm, and means for permanently interconnecting said lever and said worm comprising clutch means having complementary clutching and declutching formations movable relative to each other into clutching and declutching positions responsive to movement of said lever axially of said worm; said lever, when said clutch is in engagement, being adapted for locking the worm and slidable jaw in work-clamping positions; said worm, when said clutch is disengaged, being freely rotatable with respect to said lever; said clutch permitting the rotation of said worm by said lever through 360°.*

References Cited in the file of this patent or the original patent

UNITED STATES PATENTS

| Number | Name | Date |
|---|---|---|
| 1,309,874 | Arnot | July 15, 1919 |
| 1,503,662 | Norton | Aug. 5, 1924 |
| 1,771,692 | Saunders | July 29, 1930 |
| 2,569,581 | Ryland | Oct. 2, 1951 |

FOREIGN PATENTS

| Number | Country | Date |
|---|---|---|
| 87,607 | Switzerland | Dec. 16, 1920 |